(12) United States Patent
Bric

(10) Patent No.: US 6,263,597 B1
(45) Date of Patent: Jul. 24, 2001

(54) CORD TENSIONER FOR IRONING BOARDS

(76) Inventor: Leopold Bric, 143 Pine Moutain Dr., Plymouth, MA (US) 02360

( * ) Notice: Subject to any disclaimer, the term of this patent is extended or adjusted under 35 U.S.C. 154(b) by 0 days.

(21) Appl. No.: 09/705,651

(22) Filed: Nov. 6, 2000

(51) Int. Cl.$^7$ .................................................... D06F 81/00
(52) U.S. Cl. .............................................. 38/142; 38/141
(58) Field of Search ............................ 38/142, 141, 106, 38/107; 248/51; 242/47.01

(56) References Cited

U.S. PATENT DOCUMENTS

| | | | | |
|---|---|---|---|---|
| 2,203,962 | * | 6/1940 | Lamb | 38/142 |
| 2,472,244 | * | 6/1949 | Brady | 38/142 |
| 2,666,999 | * | 1/1954 | Brandt | 38/107 |
| 2,860,427 | * | 11/1958 | Fastinger | 38/142 |
| 3,214,851 | * | 11/1965 | Webster | 38/141 |

* cited by examiner

Primary Examiner—Ismael Izaguirre
(74) Attorney, Agent, or Firm—Werner H. Schroeder

(57) ABSTRACT

The invention pertains to an ironing system including an ironing board and an iron operated on a top surface of the ironing board in the process of ironing a fabric on the ironing board. Included in the system is a device for keeping the electric cord of the electric iron a distance above the ironing board so that the electric cord cannot interfere with a fabric that already has been ironed. The device also keeps the electric cord of the iron from being singed or burned by the hot sole of the iron. The device includes a tensioned coil spring through which the electric cord passes to the iron as it is kept in an elevated position. The coils of the tension coil spring are close and adjacent to each when the coil spring is in a rest position. A slight extension of the tension coil spring will induce a retracting force in the spring so that the electric cord will be withdrawn into the tension spring coil and away from the iron.

7 Claims, 2 Drawing Sheets

CORD TENSIONER FOR IRONING BOARDS

BACKGROUND OF THE INVENTION

The invention pertains to a device or a system to control the electric cord of an electric iron during the process of ironing fabric on a flat surface, particularly, on a common iron board. In the process of ironing fabric on a flat surface, such as a common ironing board, the cord of an electric iron often interferes with the movement of the iron. The cord often wrinkles the already ironed fabric. The cord also gets in the way of the movement of the iron. For example, moving the iron in one direction pulls the cord with or behind the iron but on a return stroke in the opposite direction, the cord just lies there on the flat surface or on the already ironed fabric and gets in the way of the iron. This can also create a danger in that the iron sole plate, being hot, can singe or even burn or melt the cord. This, obviously can lead to injuries to the person doing the ironing. Several solutions have been introduced to reduce the interference from the iron's cord.

DESCRIPTION OF THE PRIOR ART

U.S. Pat. No. 4,042,082 is a device for receiving, from a fixed electric connection, adapting to length, and holding conductors for the electric current supply of movable electric consumers. The electric conductors are moved by way of at least one carriage in conformity with the movement of the electric consumer along a guiding path. This device appears to be very complicated and would not be suitable for a homemaker doing his or her own ironing.

U.S. Pat. No. 4,517,757 discloses an electric cord control device for an electric iron which includes a reel device having a drum therein with a spring to urge the reel in a wind-up direction. Again, this device is somewhat complicated to be used by a homemaker.

U.S. Pat. No. 4,612,717 describes a retaining guide for an electric iron cord which extends between an electric outlet and an electric iron atop an ironing board. The device includes a ring for a sliding extension of the cord therethrough during movement of the electric iron atop the ironing board. The retaining guide includes features defining at least one opening on the ironing board for the extension of the ring therethrough. This device would be cumbersome for the average homemaker since very few ironing boards have any openings therethrough.

U.S. Pat. No. 5,065,964 illustrates a device consisting of two parts to control the cord of an electric iron during the process of ironing fabric on a common ironing board. The first part is a strap with a loop to position the iron's cord on the board. The second part is a weight to pull the iron's cord in reverse. The problem with this kind of device is that the ironing board must positioned in a certain location or position so that the weight can properly assert its influence on the electric cord.

U.S. Pat. No. 5,607,125 discloses an iron cord holder which will keep the electric cord out of the way when ironing. The holder has a pair of spring biased spindles which rotate in opposite directions from each other. The spindles are spaced apart so that the iron cord will fit between them in a tight friction fit. It is believed that since the cord operates the spindles, the friction on the cord surface will have a detrimental effect on the surface of the cord.

U.S. Pat. No. 5,727,343 describes a device for controlling the tension in the electric cord of an electric iron. This device includes a weight clip which resiliently engages the cord and is suspended from the cord subsequent to a guide clip to pull the cord and to maintain it.

OBJECTS OF THE INVENTION

An object of the invention is to improve the ironing efficiency by restricting the movement of the electric cord during the process of ironing such that the iron electric cord does not become entangled with itself or fabric to be ironed or ironed already, but most of all cannot come in contact with the hot sole of the iron itself. It is another object of the invention to improve the efficiency of the process of ironing fabrics by way of a simple, inexpensive, light weight, easily transportable and/or easily storable device. The device involves very few parts and can easily be installed in minutes with little skill or instructions.

DETAILED DESCRIPTION OF THE INVENTION

Figure 1:
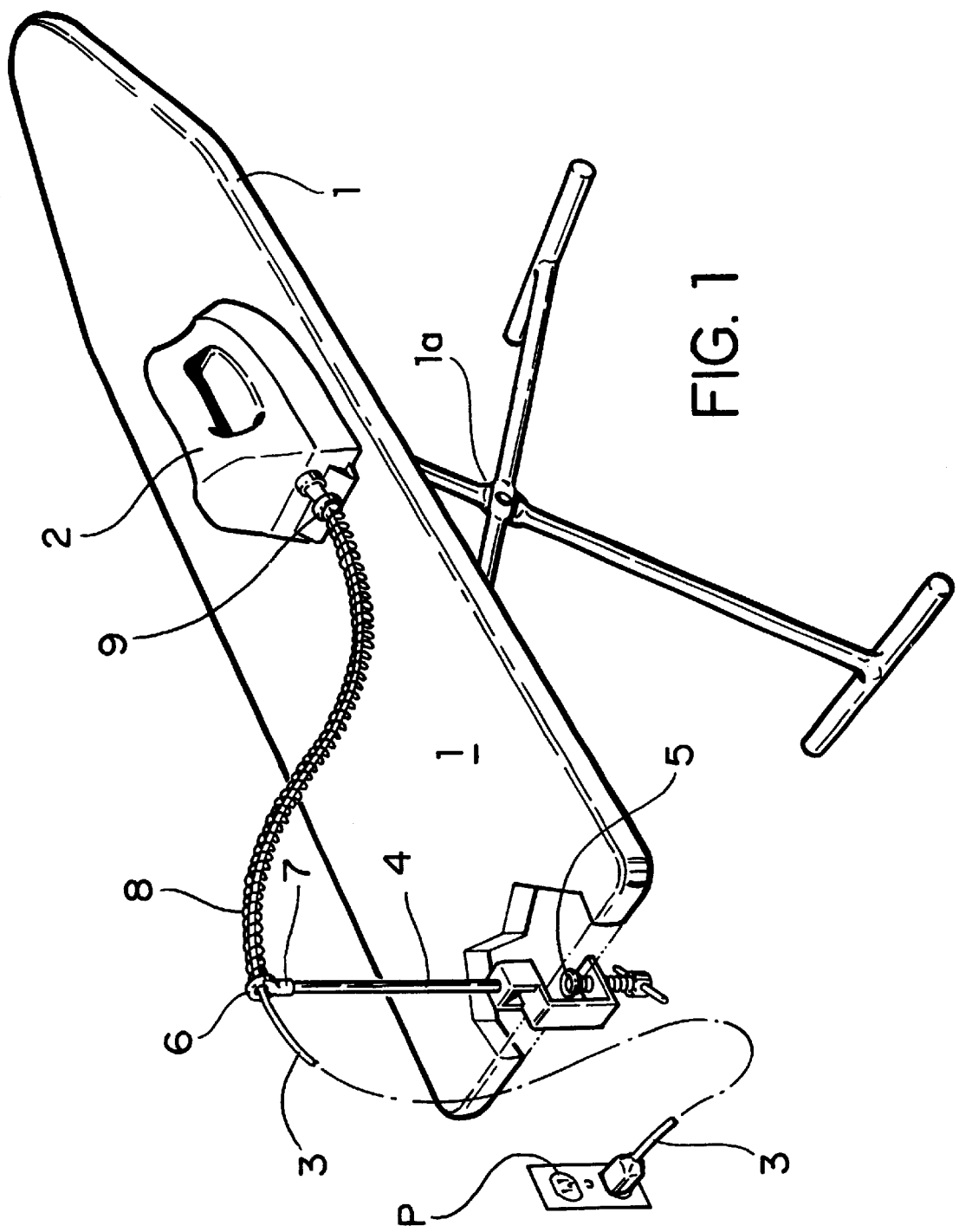
FIG. 1 shows the overall combination of an ironing table and an electric iron placed thereon including the inventive cord retainer.

FIG. 1 shows the ironing table at 1 with its supporting legs 1a. It is obvious that any other flat supporting surface may be used to practice the invention. On the ironing table 1 there is shown the electric iron 2 having a cord 3 extending therefrom. FIG. 1 shows the cord extending from a rear surface of the so-called heel of the iron. It is well known that on many irons, the electric cord extends from a side surface of the iron so that the iron can be set on its heel during a temporary rest period. Other irons have the electric cord extending from the rear and top of the handle. The invention is equally applicable to the irons mentioned above. For convenience of explanation, the illustration of FIG. 1 has the electric cord extending from a rear surface. The illustrated iron of FIG. 1 must be placed on an insulated plate or rack when in a temporary rest position.

The electric cord 3 extends from the iron 2 to a power outlet P on a wall. The electric cord 3 is loosely encased in tension coil spring 8. The coil spring 8 extends from the iron 2 to a ring 6 located above the surface of the ironing board 1. The ring 6 is supported above the ironing board 1 by an upright support rod or standard 4. The ring 6 is also roatably supported on the rod 4 by a hollow sleeve 7 which is fitted over the rod 4. The reason for this is that the coil spring 8 will always point in the direction in which the iron is moving during the process of ironing because the ring 6 on which the coil spring is fastened can easily turn on the upright rod 4 by way of its hollow tube. Another reason why the ring 6 should be rotatable on the upright rod 4 is that when the insulator 10 and thereby the electric cord 3 extends from a side of the iron, instead of from the rear, there will be a slight curve in the coil spring 8 which will be compensated by the rotating ring 6. The upright rod 4 is mounted on the ironing board 1 by way of a separate clamp 5 or the rod 4 could have the well known C-clamp attached thereto. The ring 9, to which the spring coil 8 is attached, is attached to the iron by way of the rubber insulator sleeve 10 through which the electric cord 3 extends into the interior of the iron 2. The ring 9 must be a ring because the electric cord is guided therethrough. the ring 9 could have a clamp attached thereto so that it can be clamped to the insulator 10. On the other hand, the ring could be omitted altogether because a clamp to which the coil spring 8 is attached would suffice. The coil spring 8 itself should be of a specially coiled configuration. When in a rest position the individual coils should be touching each other in a snug manner so that the slightest extension of the coil spring would immediately exert a retraction force on the spring. This way, the starting position of the iron 2 would be as close as possible to the upright rod 4. FIG. 1 also shows that the coil spring 8 and the cord 3 running therethrough is kept above the ironing board 1 without touching the fabric having been ironed already.

Figure 2:
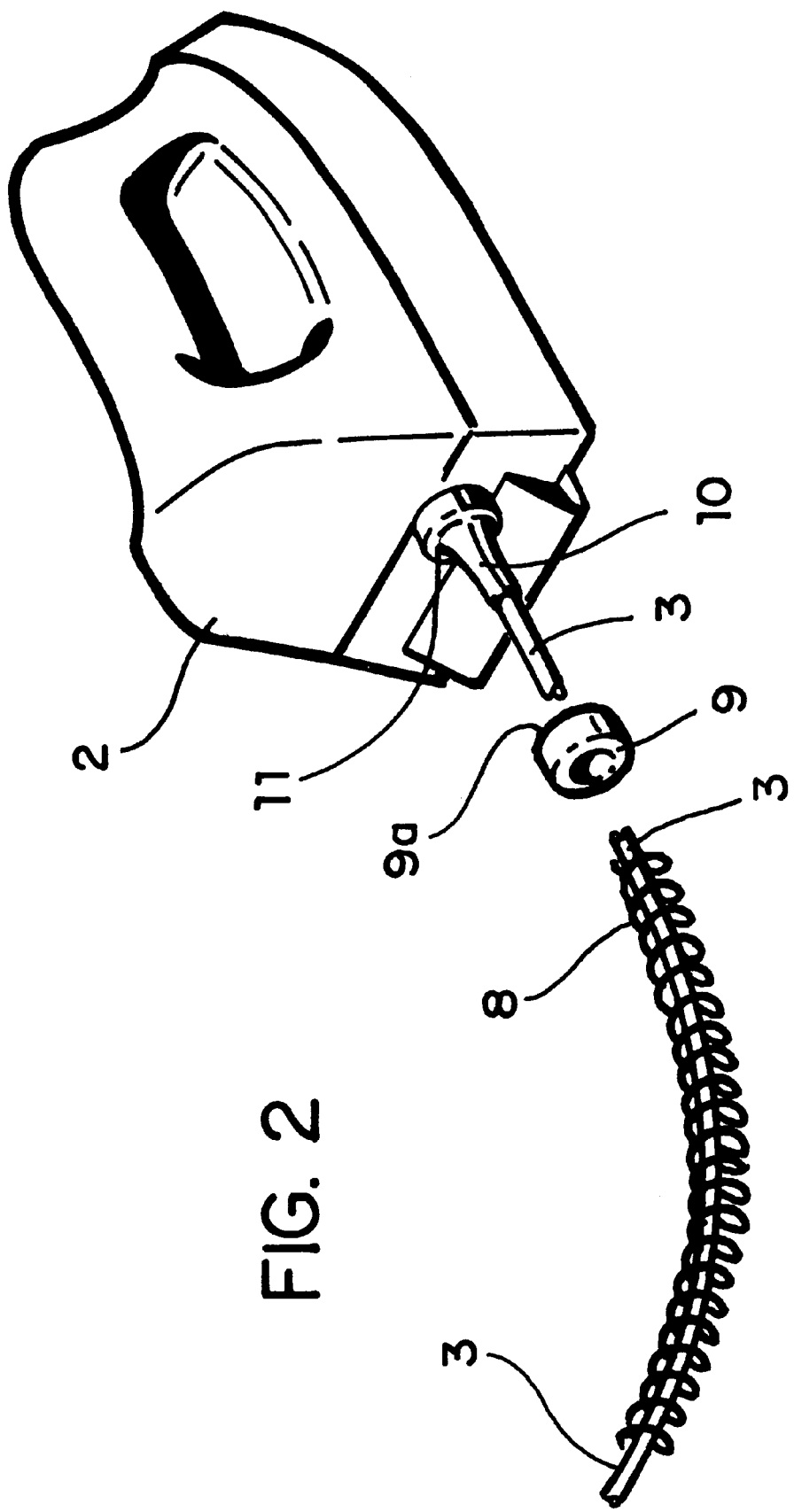
FIG. 2 shows the details of retaining a spring on the iron.

Turning now to FIG. 2, there is shown a different way of attaching the ring to the iron without having to resort to an insulating rubber extension 10. In this embodiment, the ring 9 is fastened to the iron 2 by way of a VELCRO™ system. In this embodiment a ring of hook and/or loops is attached to the iron 2 and a ring 9 having a ring of hook and/or loops 9*a* is attached to the ring 9 which then is slipped over the electric cord 3 together with its coil spring 8 attached thereto and then is simply fastened to the hook and/or loop ring 11. This assures a quick and sure connection of the coil spring 8 to the iron 2.

CONCLUSION

From all of the above it now be seen that a simple and inexpensive system has been created which will keep the electric cord off the top of the ironing table and thereby, of course, off the items that have already been ironed. This is so because the electric cord is maintained above the ironing surface of the ironing board. The inventive concept also keeps the electric cord always in a retracted position so that the cord cannot interfere with the movement of the iron, especially its hot bottom sole so that the electric cord cannot be singed or otherwise damaged. As is disclosed, the inventive concept consists of a few parts that can easily be installed on an ironing board or any other flat surface suitable for ironing. These were the objects of the invention.

What I claim is:

1. An ironing system including an ironing board and an electric iron including an electric cord for delivering power to said iron, a retraction system for keeping said electric cord off the surface of said ironing board and from interfering with the movements of said iron, said retraction system comprising a tension coil spring, said electric cord passing through said tension coil, means for maintaining said coil spring from a surface of said iron board at an elevated position at an end of said ironing table, said elevated position includes an upright rod having at its upper end a ring attached thereto to which one end of said tension coil spring is attached, another end of said tension coil spring is attached to said iron, said tension coil spring consists of a multiple of coils being spaced adjacent to each other when said tension coil spring is in a relaxed position.

2. The ironing system of claim 1, wherein said ring attached to said upstanding rod at its upper end is rotatably attached thereto.

3. The ironing system of claim 1 including means for attaching said upright rod to said ironing board.

4. The ironing system of claim 1 including means for attaching said tension coil spring to said iron.

5. The ironing system of claim 4, wherein said means for attaching includes a ring attached to a rubber insulator extending from said iron.

6. The ironing system of claim 5 including a clamp on said ring for retaining said ring to said insulator.

7. The ironing system of claim 4 including a hook and loop system for attaching said tension coil spring to said iron.

* * * * *